Figure 1:
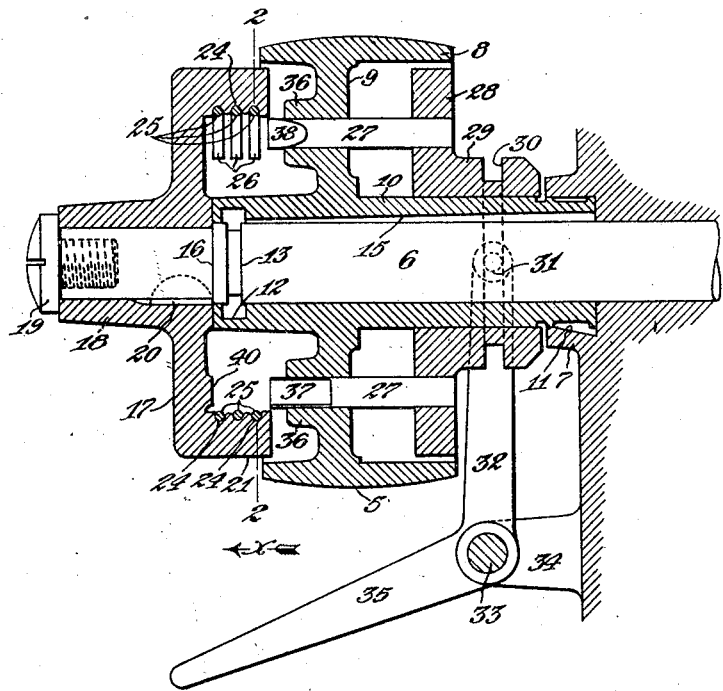

Sept. 23, 1924.

C. A. BRINK

CLUTCH AND SPEED CONTROLLING DEVICE

Filed June 10, 1921

1,509,469

Inventor
Carl A. Brink,
By Watson, Coit,
Morse & Grindle,
Attorneys.

Patented Sept. 23, 1924.

1,509,469

UNITED STATES PATENT OFFICE.

CARL A. BRINK, OF CRANSTON, RHODE ISLAND, ASSIGNOR, BY MESNE ASSIGNMENTS, TO THE NEW ENGLAND TRUST COMPANY, TRUSTEE, A CORPORATION OF MASSACHUSETTS.

CLUTCH AND SPEED-CONTROLLING DEVICE.

Application filed June 10, 1921. Serial No. 476,473.

*To all whom it may concern:*

Be it known that I, CARL A. BRINK, a citizen of the United States, residing at Cranston, in the county of Providence, State of Rhode Island, have invented certain new and useful Improvements in Clutch and Speed-Controlling Devices, of which the following is a specification.

My invention is an improved clutch and speed-controlling device for effecting a driving connection between two or more machine elements and for regulating the rate of speed at which the driven-element receives motion from the driving-element.

One object of the invention is to provide means for transmitting motion from the driving-element to the driven-element to start the latter at a low rate of speed with a gradual acceleration until the maximum is reached.

Another object of the invention is to provide for starting the driven-element with a smooth, easy action to overcome the effect of inertia without undue shock or strain on the going parts or the mechanism connected therewith.

Another object of the invention is to provide means for starting a machine or other apparatus at relatively slow speed to prevent strain or breakage of the material being operated upon in the machine.

Another object of the invention is to provide means for stopping a machine or apparatus with a gradually retarded speed as sometimes required.

Further objects of the invention are to simplify the structure of the clutch and speed-controlling device; to economize in its cost of manufacture; to reduce the wear on its mechanism; and in general to render it more efficient in action and more durable in use.

The manner and means for carrying out these improvements are fully set forth in the following specification which describes a preferred embodiment of the invention as illustrated by the accompanying drawings.

Figures 2, 3:
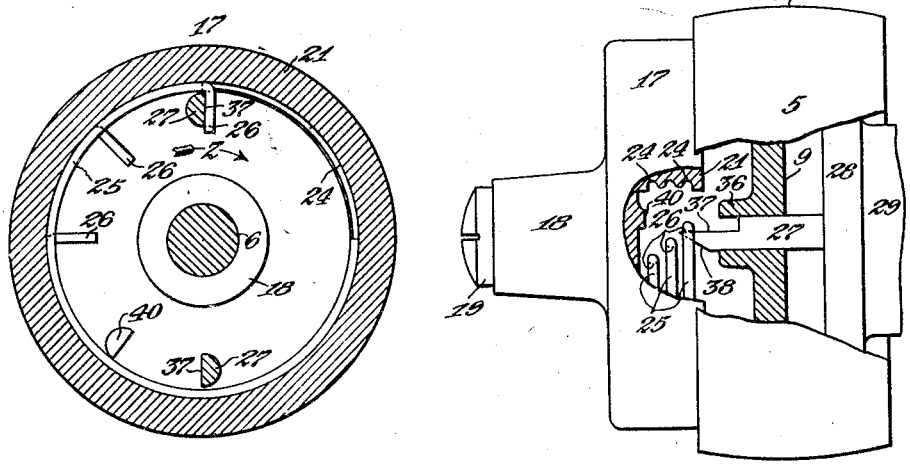

In the drawings:

Fig. 1 is a vertical sectional view of the device taken in a plane intersecting its axis of rotation;

Fig. 2, a cross sectional view of the clutch-element of the device taken on the line 2—2 of Fig. 1, looking in the direction indicated by the arrow *x*; and Fig. 3, a side view of the device showing a portion of the rims of the driven-element and the driving-element broken away to disclose the parts enclosed therein.

Referring to the drawings, I have preferred to herein illustrate my invention as applied to use in transmitting rotation from a driving-element, such as a wheel or pulley 5, to a driven-element, such as a shaft 6. It is to be understood, however, that the arrangement of these parts may be reversed if desired, with the shaft constituting the driving-element for imparting rotation to the pulley; and likewise the device may be otherwise modified within the spirit and scope of the invention, whereby the driving- and driven-elements may take different forms, such as gears, sprockets or other machine parts of well known construction and application in the mechanical arts.

As shown in Fig. 1, the shaft 6 is journaled in a bearing 7 which may be a part of the machine on which the device is used or of any other construction as desired. The shaft 6 overhangs the side of the bearing 7 and carries the driving-element 5 freely rotatable thereon. As herein shown the driving-element 5 takes the form of a belt-pulley having a crowned rim 8 supported by a flange or web 9 surrounding its hub 10. The hub 10 is extended a considerable distance beyond the side of the pulley and at its right-hand end is received in a counterbore 11 in the bearing 7, whereby to provide an oil guard for the hub. At its opposite end the hub 10 is formed with an undercut groove 12 overhanging a peripheral groove 13 in the shaft 6, thereby forming an oil reservoir from which a distributing groove or duct 15 leads along the interior of the bore in the hub 10.

The shaft 6 projects outwardly beyond the end of the hub 10 and is reduced in diameter to form a shoulder 16. Mounted fast on the reduced portion of the shaft 6 is a clutch-member 17, which may constitute either the driving- or driven-element of the device, and in the present embodiment is employed as the means for connecting the pulley 5 to drive the shaft 6. The member 17 may be secured fixedly to the shaft 6 by any suitable means and, as shown in Fig. 1, it is formed with a hub 18 held against the shoulder 16 on the shaft 6 by means of a screw 19 at its outer end. The screw 19 is screwed into a threaded hole in the end of the shaft 6 and in some instances I may employ a spline or key 20 engaging grooves in the shaft and pulley to secure the parts rotatively together. The member 17 is provided with an overhanging rim 21 which is formed on its interior with relatively shallow, annular grooves 24. The grooves 24 are adapted to receive a series of wire rings 25 which constitute the friction clutching-means for the device. As shown in Fig. 2, the rings 25 extend throughout substantially 270° or three-quarters of the circumference of the rim 21. The rings 25 are preferably constructed of spring-tempered wire and are sprung into the grooves 24 to adapt them to be retained in place by their inherent tension which causes them to expand against the interior of the rim to exert a frictional gripping action thereagainst. Any suitable number of friction-rings 25 may be employed in accordance with the load to be driven through the clutch, and in the present drawings I have shown three rings as being sufficient for the purpose intended. Each ring 25 has one of its ends bent radially inward to form a finger or spur 26 which constitutes the engaging-means for effecting the driving-connection between the driving- and driven-elements of the clutch.

As shown in Figs. 1 and 2, the spurs 26 are adapted to be engaged by one or more pins 27 arranged to slide in under the rim 21 and across the several rings 25 held in its grooves 24. The pins 27 are fixedly mounted in a member 28 which slides on the hub 10 of the pulley 5. As shown in Fig. 1, the member 28 takes the form of a disk or flange having a hub 29 bored to fit over the hub 10. On the periphery of the hub 10 is an annular groove 30 which is engaged by the pins or trunnions 31 of a forked shipper-lever 32 of the type commonly used for operating the shiftable element of clutch-devices. As herein illustrated the lever 32 is pivoted on a stud or shaft 33 held in a lug 34 projecting from the side of the bearing 7. The lever 32 may be provided with a handle 35 to adapt it for manual control, or it may be connected to suitable mechanism for effecting its automatic operation as frequently provided in various types of machines.

As herein illustrated the pins 27 carried by the member 28 have their ends driven into suitable holes in the disk portion of the member, or they may be fastened thereto by any other means as preferred. The forward portions of the pins 27 project through holes in bosses 36 on the web 9 of the pulley 5 and thus key the member 28 rotatively with the pulley. At their forward extremities the pins 27 are cut away on the side to provide flat faces 37 adapted to engage against the sides of the spurs 26 on the rings 25, see Figs. 2 and 3. The opposite sides of the pins 27 are beveled off at 38 whereby to provide relatively sharp points at the ends of the pins for selectively engaging the spurs of the clutch-rings 25 without danger of interference therebetween, this feature of the structure being more fully explained hereinafter. Having now described the structure and arrangement of my improved device in detail its method of operation will next be explained.

Referring to Fig. 1 of the drawings, this view shows the device with the clutch-operating means or pins 27 released from the clutch-rings 25. With the parts in this relation the driving-pulley 5 will be free to turn on the shaft 6 without rotating the latter; or when the shaft constitutes the driving-element it is allowed to rotate freely without imparting motion to the driven-element or pulley 5. For the purpose of this explanation the pulley 5 will be considered as the driving-element and when it is desired to drive the shaft 6 therefrom the clutching-means is operated as follows: Considering the lever 32 as the starting-means for effecting manual control of the operation of the machine to which the device is applied, the operator presses down on the handle 35 to rock the lever to slide the member 28 in the direction indicated by the arrow x in Fig. 1. This sliding movement of the member 28 causes the pins 27 to be projected through the bosses 36 on the pulley 5 to slide them in under the flange 21 on the member 17. During this action the driving-member 5 is driven constantly from a belt or other means with the member 28 and the pins 27 turning with it. Consequently, as the pins 27 slide in under the first clutch-ring 25 one of them will eventually engage with the finger or spur 26 at its end, see Figs. 2 and 3, and the ring will therefore be carried around with the pulley 5. As the first ring 25 is thus connected to the pulley 5 and rotated therewith its frictional engagement with the groove 24 in the clutch-member 17 will tend to start rotation of the latter to drive the shaft 6. The clutching-action of the ring 25 on the member 17 is proportioned to allow lost motion between these parts or, in other words, there is a certain amount of slippage between the ring 25 and the clutch-member 17 so that the rotation of the latter is relatively slow at first. Now as the movement of the lever 32 is continued to slide the member 28 still further the pins 27 will be projected into position opposite the second ring 25 and, since the pulley 5 rotates faster than the member 17, one of the pins will eventually be carried into engagement with the spur 26 on the second ring. As soon as the second ring 25 is coupled to the pulley 5 in this manner its frictional engagement with the member 17 will augment the clutching-action of the first ring and consequently the member 17 will be driven from the pulley 5 with less lost motion so that the speed of the shaft 6 will be graually accelerated. Meanwhile the action of the lever 32 continues the sliding movement of the member 28 until finally the pins 27 are brought in under the third ring 25 and as one of the pins engages with its spur 26 the clutching effect is still further augmented. The device is thus operated to successively connect the several rings 25 positively with the driving-member 5 whereby the frictional clutching-action on the driven-member is gradually increased until both members rotate together at equal speed.

In the present arrangement the frictional engagement between the three rings 25 and the member 17 is proportioned to take the maximum load imposed on the shaft 6, but it will be understood that a greater or less number of clutch-rings may be employed in accordance with the amount of load-resistance on the driven-member; and likewise it is also obvious that the arrangement of the parts could otherwise be varied within the spirit and scope of the present invention. As an instance of such modifications the clutch-rings could be arranged to act frictionally on the driving-member instead of the driven-member and other means may be employed for successively engaging the rings.

It will be noted from Fig. 2 that the rings 25 are arranged with their spurs or arms 26 at their leading ends. That is to say, the pins 27 engage in back of the spurs 26 to turn the rings 25 in the direction indicated by the arrow z in Fig. 2 so that the free ends of the rings trail their connected ends. With this arrangement the rings have a freer action in their grooves 24 or, in other words, they exert less gripping effect than if their trailing ends were made the leading ends. Where a greater frictional gripping action is required, however, as with relatively heavy loads, I have found that by reversing the position of the rings in relation to the direction of the drive their coefficient of expansion is materially increased so that their clutching-action is correspondingly augmented. Stated briefly, with the rings extending in the opposite direction from that illustrated in Fig. 2, or with the direction of drive reversed, which is the equivalent, the engagment of the pins 27 with the trailing ends of the rings will have a tendency to expand the rings to cause them to exert a dogging action in the grooves 24 on the member 17 with which they cooperate. In some cases, therefore, as with extra heavy loads, I have found it convenient to arrange one or more of the rings in the reverse position to that shown in the drawings; for instance, the ring to be last engaged may have its clutching-action increased in this manner so as to insure a more positive driving connection between the parts when all of the rings are active. As a further means for effecting a positive engagement between the driving-member and driven-member the pins 27 may be arranged to engage with a pin or lug 40 projecting from the web of the member 17, see Figs. 1 and 2.

Referring to Fig. 3, the purpose of forming the pins 27 with beveled or pointed ends is to provide for their proper engagement with the several clutch-rings 25 without interference therebetween. If the ends of the pins were made blunt they might strike against the side of the spurs and thus be prevented from sliding into place at the rear thereof. In Fig. 3 the pin 27 is shown as engaged in back of the spur 26 on the first ring 25 and ready to engage the spur on the second ring. Now as the pin 27 is slid further toward the second ring should the spur on the latter chance to be in position slightly to the rear of the first spur as shown the pointed end of the pin will wedge itself past the second spur without striking against it so that at the next half rotation of the pulley 5 with respect to the member 17 the other pin will come into proper engagement behind the second spur; and likewise the same selective engagement will take place as regards the other rings of the series. In this way the engagement of the pins in back of the spurs takes place without danger of their binding against the sides of the spurs and being prevented from sliding into proper position in relation thereto.

It has been explained that my improved device operates to effect driving engagement between the elements to start the driven-element slowly with a gradually accelerated speed, and it is obvious that the operation of the mechanism may be reversed to arrest the action of the driven-element with a gradually retarded speed. That is to say, when the lever 32 is rocked to slide the clutch-engaging member 28 in the opposite direction from that indicated by the arrow x in Fig. 1 the clutch-rings 25 will be released from the pins 27 in regular succession to gradually diminish the clutching-action on the member 17 so that the latter will rotate with increasing lost motion until finally, when all of the rings are free from the pins, it will come to rest upon the overcoming of its momentum. If a more prompt stopping of the driven-member is desired a quicker action of the control-lever 32 will cause practically instantaneous disengagement of the clutch-rings and the quick stopping of the driven-member may be effected by suitable braking-devices not herein shown.

It will be observed from the foregoing that my invention provides an extremely simple, compact and efficient device for effecting a clutching-action between two or more elements to start the driven-element at slow speed while gradually accelerating its motion. The arrangement of the several clutch-rings in their respective grooves insures a smooth, easy clutching-action without shock or strain on the parts, and wear on the clutching surfaces is reduced to a minimum. Furthermore, such slight wear as may ensue is compensated for by the expansion of the rings under their inherent spring tension and thus the mechanism has greater durability under continued use. My improved device consists of relatively few elements which are simple to construct and easy to assemble, and hence the apparatus is extremely economical to manufacture.

Various modifications may be made in the structure and arrangement of the parts of the apparatus as herein shown without departing from the spirit or scope of the invention; therefore, without limiting myself to the present embodiment, I claim:

1. In a clutch and speed-controlling device, the combination of a driving-element, a driven-element, a series of annular split clutch-members arranged to frictionally engage with one of said elements, and means to successively connect the several clutch-members with the other element to operate said members to effect a clutching-action with a gradually augmented force.

2. In a clutch and speed-controlling device, the combination of a driving-element, a driven-element, a series of radially expansible clutch-members arranged to frictionally engage with one of said elements, and means to progressively connect the several clutch-members positively with the other element to cause them to operate with variable clutching-action to control the speed of the driven-element.

3. In a device of the type specified, the combination of a driving-element, a driven-element, a series of radially expansible clutch-rings arranged to frictionally engage with one of said elements, and means to successively engage the several clutch-rings with the other element to cause said rings to operate with a clutching-action whereby to impart motion to the driven-element at variable speeds.

4. In a device of the type specified, the combination of a driving-element, a driven-element, one of said elements being provided with a series of annular grooves, a series of split clutch-rings in frictional engagement with the grooves of the grooved element, and means for progressively engaging the clutch-rings with the other element whereby to impart motion to the driven-element at variable speeds.

5. In a device of the type specified, the combination of a driving-element, a driven-element, a series of radially expansible clutch-members in frictional engagement with one of said elements, means to successively connect the friction-members with the other element, and means for positively connecting the driving-element with the driven-element after the friction-members have been brought into operation.

6. In a device of the type specified, the combination of a driving-element, a driven-element, a plurality of radially expansible clutch-members normally held under tension in frictional engagement with one of said elements, and means to successively engage the friction-members with the other element to impart motion to the driven-element at variable speeds.

7. In a device of the type specified, the combination of a driving-element, a driven-element, a plurality of radially expansible clutch-rings in frictional engagement with one of said elements, and means for successively engaging said clutch-rings positively with the other element to impart motion to the driven-element at variable speeds.

8. In a device of the type specified, the combination of a driving-element, a driven-element, one of said elements provided with annular grooves, a series of expansible clutch-rings seated in said grooves in frictional contact therewith, and means for successively engaging said rings with the other element to effect driving connection between said elements at variable speeds.

9. In a device of the type specified, the combination of a driving-element, a driven-element, a series of radially expansible clutch-members in frictional engagement with one of said elements, and means rotatively connected with the other element and movable into position to progressively engage the clutch-members to effect driving connection between said elements at variable speeds.

10. In a device of the type specified, the combination of a driving-element, a driven-element, one of said elements provided with a series of annular grooves, a series of split clutch-rings seated in said grooves, and means rotatable with the other element and movable into engagement with one of the ends of each clutch-ring to effect driving connection between the elements at variable speeds.

11. In a device of the type specified, the combination of a driving-element, a driven-element, a series of radially expansible clutch-members in frictional engagement with one of said elements, and means rotatable with the other element and adapted to be slid into position to progressively engage the several clutch-members to effect driving connection between the elements.

12. In a device of the type specified, the combination of a driving-element, a driven-element, a series of radially expansible clutch-members in frictional engagement with one of said elements, means rotatively connected with the other element and shiftable into position to progressively engage the clutch-members, and means to shift said engaging-means.

13. In a device of the type specified, the combination of a driving-element, a driven-element, a series of radially expansible clutch-rings in frictional engagement with one of said elements, and a pin slidably mounted on the other element to adapt it to be progressively engaged with the several clutch-rings.

14. In a device of the type specified, the combination of a driving-element, a driven-element, a series of split clutch-rings held under expansion in frictional engagement with one of said elements and provided with radial spurs at one of their ends, and means on the other element for progressively engaging with the spurs on the several clutch-rings to connect the two elements to be driven one from the other.

15. In a device of the type specified, the combination of a driving-element, a driven-element, a series of radially expansible clutch-rings in frictional engagement with one of said elements, a slidable clutch-member rotatively connected with the other element, means to slide said clutch-member, and means carried by said clutch-member adapted to progressively engage the several clutch-rings during the sliding movement of the member.

16. In a device of the type specified, the combination of a rotatable driving-element, a rotatable driven-element, a series of radially expansible clutch-rings in frictional engagement with one of said elements, a clutch-member mounted to slide axially with respect to said elements, pins carried by said clutch-member, and means to slide the clutch-member to progressively engage the pins with the several clutch-rings.

17. In a device of the type specified, the combination with a rotatable element, of a second element rotatable independently of the first element, a series of radially expansible clutch-rings in frictional engagement with the first element, and pins slidably mounted in the second element to adapt them to be progressively engaged with the clutch-rings on the first element.

18. In a device of the type specified, the combination with a rotatable element, of a second element rotatable independently of the first element, radially expansible clutch-rings in frictional engagement with one of said elements, and means projecting from one of said elements and provided with pointed ends adapted to successively engage with the clutch-rings on the other element without interference therebetween.

19. In a device of the type specified, the combination with a rotatable element, of a second element rotatable independently of the first element, radially expansible clutch-rings in frictional engagement with one of said elements, a disk-like member adapted for sliding movement axially of said elements, and pins projecting from said disk-member and slidable through holes in one of the elements to adapt them to be successively engaged with the clutch-rings.

20. In a device of the type specified, the combination with a rotatable element, of a second element rotatable independently of the first element, radially expansible clutch-rings in frictional engagement with one of said elements, a slidable member having means adapted to progressively engage the clutch-rings to connect the elements to rotate together at variable speeds, and a lever for sliding the member.

In testimony whereof I affix my signature.

CARL. A. BRINK.